United States Patent
Lin et al.

(10) Patent No.: US 7,992,158 B2
(45) Date of Patent: Aug. 2, 2011

(54) OPTICAL RECORDING AND/OR REPRODUCING DEVICE INCLUDING A WORM GEAR RESTRICTING DEVICE

(75) Inventors: Hung-Ming Lin, Taipei Hsien (TW); Hao Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 845 days.

(21) Appl. No.: 11/952,135

(22) Filed: Dec. 7, 2007

(65) Prior Publication Data

US 2008/0222667 A1    Sep. 11, 2008

(30) Foreign Application Priority Data

Mar. 7, 2007   (CN) .......................... 2007 1 0200256

(51) Int. Cl.
*G11B 7/00* (2006.01)
(52) U.S. Cl. ........................................ 720/665; 720/677
(58) Field of Classification Search .................. 720/609, 720/663–665, 671–679; 74/842, 29–35, 74/76–81, 89.14, 89.17–89.19, 10.8–10.85, 74/425–427; 24/518–520, 542–544
See application file for complete search history.

(56) References Cited

U.S. PATENT DOCUMENTS

| | | | |
|---|---|---|---|
| 6,285,649 B1 * | 9/2001 | Bessho et al. | 720/675 |
| 2004/0268372 A1 | 12/2004 | Liu | |
| 2005/0149960 A1 | 7/2005 | Pu | |
| 2005/0235539 A1 * | 10/2005 | Story | 40/633 |
| 2006/0080692 A1 * | 4/2006 | Yang et al. | 720/676 |
| 2006/0161938 A1 * | 7/2006 | Bae et al. | 720/663 |
| 2006/0200839 A1 * | 9/2006 | Tabor et al. | 720/676 |

FOREIGN PATENT DOCUMENTS

JP          09204744 A   *   8/1997

OTHER PUBLICATIONS

Machine-Assisted Translation of JP 09204744 A.*

* cited by examiner

*Primary Examiner* — Wayne R Young
*Assistant Examiner* — Nathan A Danielsen
(74) *Attorney, Agent, or Firm* — Frank R. Niranjan

(57) ABSTRACT

According to one aspect, an optical recording and/or reproducing device for reading and/or writing an optical disc includes a base, optical pickup head, and a moving mechanism for slidably moving the optical pickup head. The moving mechanism includes a worm gear, a motor for rotating the worm gear, and a rack disposed between the worm gear and the optical pickup head for transferring motion from the worm gear to the optical pickup head. The rack includes a fastening portion for fixing the rack to the optical pickup head, an engaging portion for engaging with the worm gear, a restricting portion connected to the engaging portion for preventing the engaging portion from running out of the worm gear, and a connecting portion for connecting the fastening portion with the restricting portion.

16 Claims, 4 Drawing Sheets

OPTICAL RECORDING AND/OR REPRODUCING DEVICE INCLUDING A WORM GEAR RESTRICTING DEVICE

BACKGROUND

1. Field of the Invention

The present invention generally relates to optical recording and/or reproducing devices, and, more particularly, to a mechanism for moving an optical pickup head of an optical recording and/or reproducing device.

2. Description of Related Art

In general, an optical pickup head records or reproduces information while moving across a recording medium such as a disc. The optical pickup head includes a light source for emitting laser light and an objective lens for focusing the laser to form an optical spot on the disc, so as to read or write information from or to the optical disc. The optical pickup head is driven by an optical pickup head moving mechanism, so that the optical pickup head moves along a path corresponding to a radial direction of the optical disc.

A conventional optical pickup head moving mechanism has a motor, a worm gear connected to a rotor of the motor, and a gear portion attached to the optical pickup head. The gear portion meshes with the worm gear. The motor drives the worm gear to rotate and the gear portion is linearly moved by the worm gear. Thus the optical pickup head is linearly moved in the radial direction of the optical disc correspondingly.

However, the optical pickup head cannot be moved precisely as a pressure between the worm gear and the gear portion sometimes distorts the gear portion and may disengage the worm gear.

Accordingly, a need exists for an optical recording and/or reproducing device resolving the above problem in the industry.

SUMMARY

According to one aspect, an optical recording and/or reproducing device for reading and/or writing an optical disc includes a base, optical pickup head, and a moving mechanism for slidably moving the optical pickup head. The moving mechanism includes a worm gear, a motor for rotating the worm gear, and a rack disposed between the worm gear and the optical pickup head for transferring motion from the worm gear to the optical pickup head. The rack includes a fastening portion for fixing the rack to the optical pickup head, an engaging portion for engaging with the worm gear, a restricting portion connected to the engaging portion for preventing the engaging portion from running out of the worm gear, and a connecting portion for connecting the fastening portion with the restricting portion.

Other systems, methods, features, and advantages of the present optical recording and/or reproducing device will be or become apparent to one with skill in the art upon examination of the following drawings and detailed description. It is intended that all such additional systems, methods, features, and advantages be included within this description, be within the scope of the present device, and be protected by the accompanying claims.

BRIEF DESCRIPTION OF THE DRAWINGS

Many aspects of the present optical recording and/or reproducing device can be better understood with reference to the following drawings. The components in the drawings are not necessarily drawn to scale, emphasis instead being placed upon clearly illustrating the principles of the present device. Moreover, in the drawings, like reference numerals designate corresponding parts throughout the several views.

DETAILED DESCRIPTION OF THE EMBODIMENTS

Reference will now be made to the drawings to describe preferred embodiments of a present optical recording and/or reproducing device, in detail.

Figure 1:
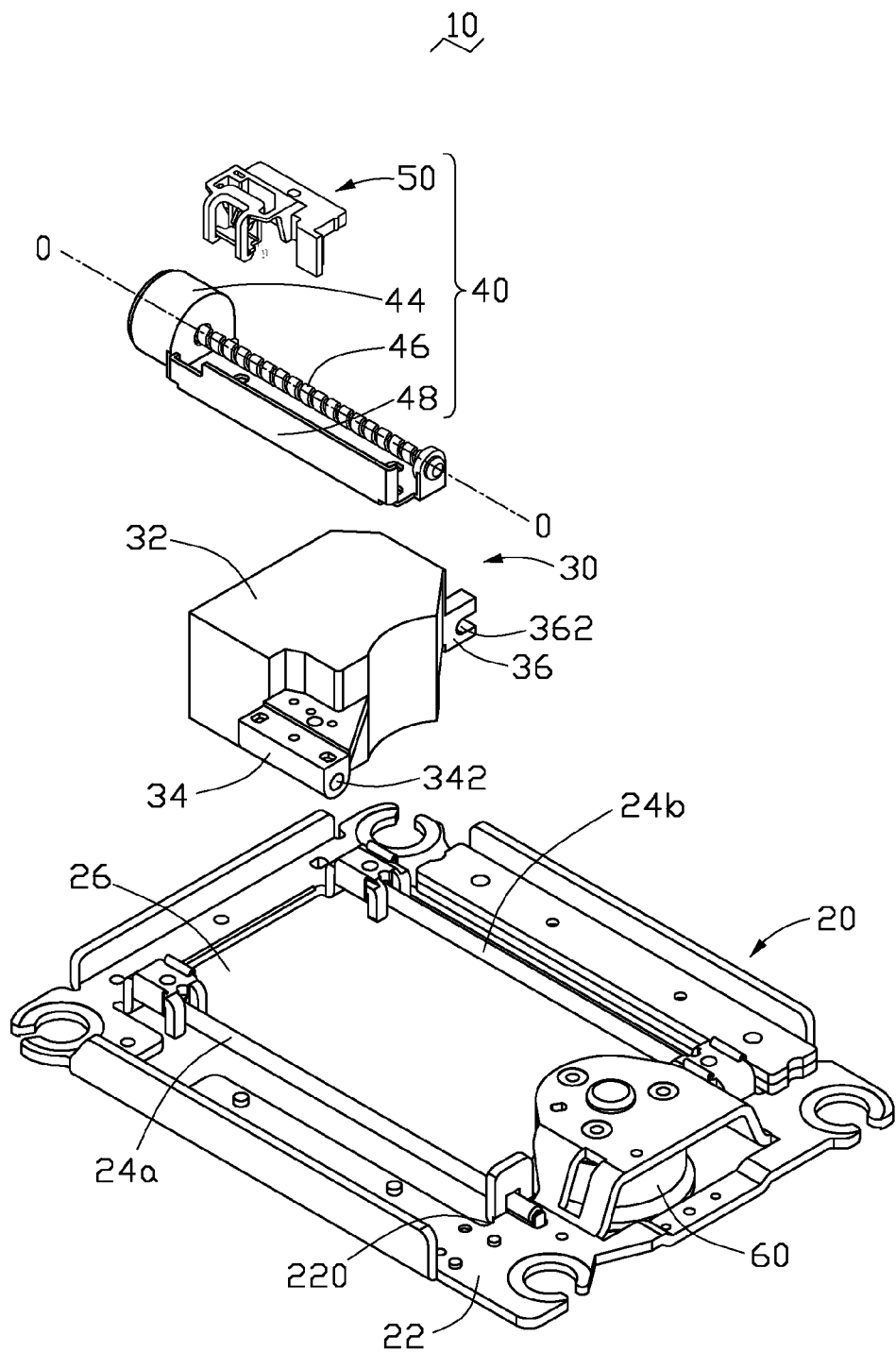
FIG. 1 is an exploded, isometric view of an optical recording and/or reproducing device in accordance with an exemplary embodiment.
Figure 2:
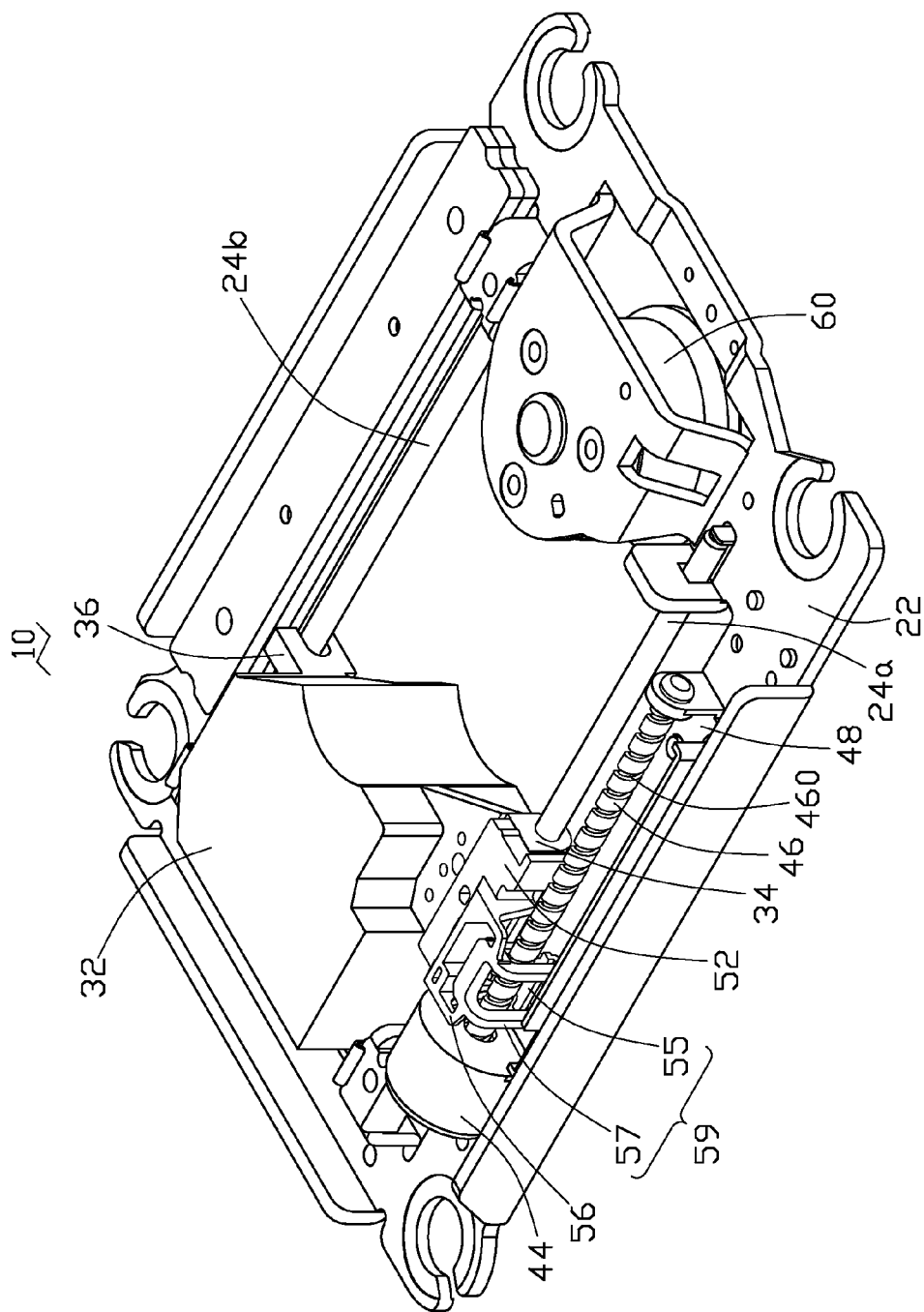
FIG. 2 is an isometric view of the optical recording and/or reproducing device of FIG. 1.

Referring to FIGS. 1 and 2, an optical recording and/or reproducing device 10 in accordance with an exemplary embodiment is illustrated. The optical recording and/or reproducing device 10 includes a base 20, an optical pickup head 30 slidably assembled on the base 20, a moving mechanism 40, and a spindle motor 60 mounted on the base 20.

The base 20 includes a chassis 22, a first guide member 24a, and a second guide member 24b. The chassis 22 defines a substantially rectangular opening 26 in a center of the chassis 22. The spindle motor 60 is mounted adjacent a shorter side of the chassis 22 for rotating an optical disc (not shown). The guide members 24a, 24b are respectively disposed on two opposite longer sides of the chassis 22.

The optical pickup head 30 includes a main body 32 for housing optical lenses etc. The optical pickup head 30 further includes a first projection portion 34 and a second projection portion 36 correspondingly formed at two lateral sides of the main body 32. The first projection portion 34 defines a guide hole 342 for slidably receiving the first guide member 24a. The second projection portion 36 defines a guide notch 362 for slidably receiving the second guide member 24b accordingly. Thus the optical pickup head 30 is able to be slidably assembled on the base 20.

The moving mechanism 40 includes a feed motor 44, a worm gear 46, a gear seat 48, and a rack 50.

The feed motor 44 is mounted on the chassis 22 at a same side of the first guide member 24a. The worm gear 46 is parallel to the first guide member 24a. One end of the worm gear 46 extends from a rotor (not shown) of the feed motor 44, and another end of the worm gear 46 is supported by the gear seat 48. A threading 460 is defined in a surface of the worm gear 46.

Figure 3:
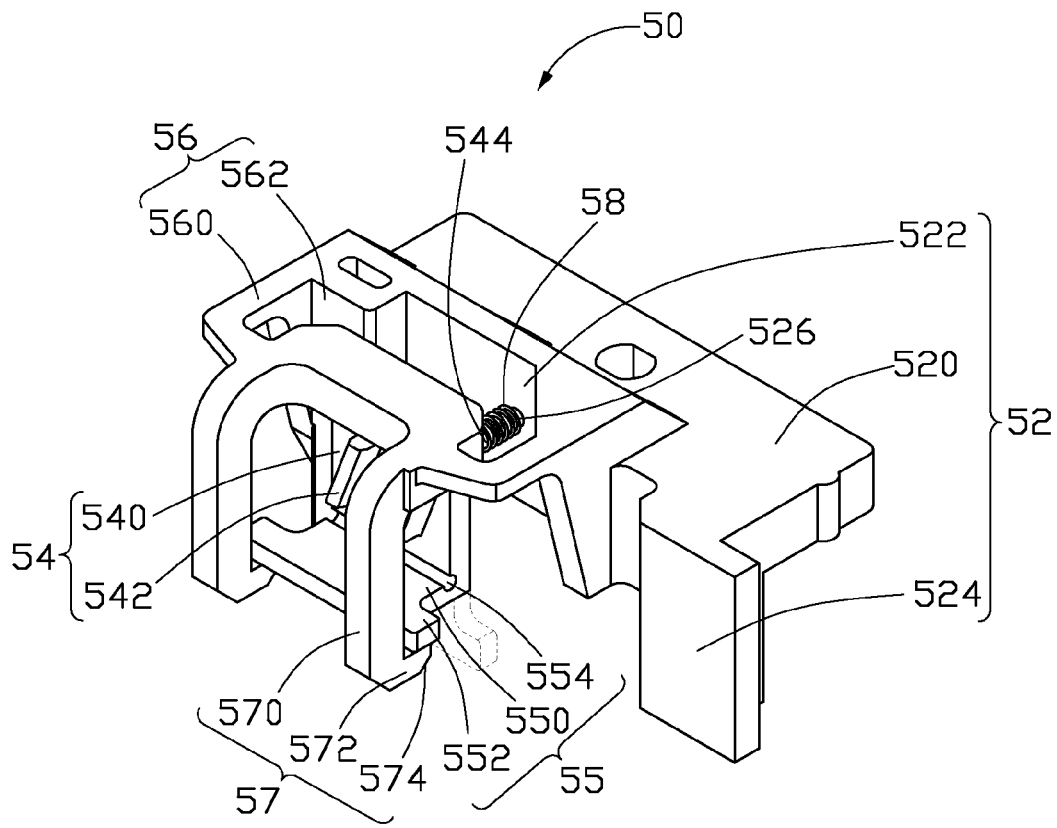
FIG. 3 is an enlarged, isometric view of a rack in FIG. 1.
Figure 4:
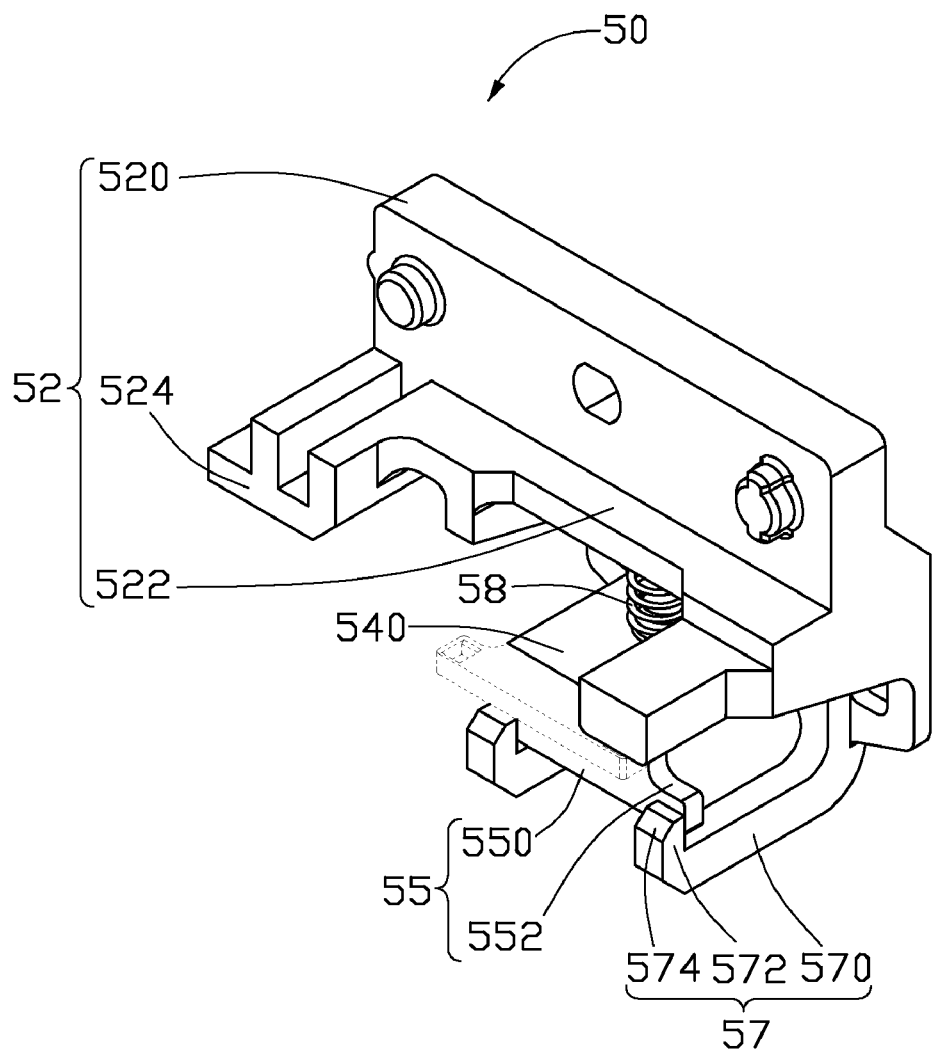
FIG. 4 is an inverted isometric view of the rack in FIG. 3.

The rack 50 is connected to the optical pickup head 30 and engaged with the worm gear 46 for moving the optical pickup head 30 when the feed motor 44 rotates. Referring also to FIGS. 3 and 4, the rack 50 includes a fastening portion 52, an engaging portion 54 opposite to the fastening portion 52, a connecting portion 56 for connecting the fastening portion 52 and the engaging portion 54, and a restricting portion 59.

The fastening portion 52 includes a mounting plate 520, a base plate 522, and a block element 524. The mounting plate 520 is configured for fixing the rack 50 to the optical pickup head 30. The base plate 522 and the block element 524 perpendicularly extend from the mounting plate 520. A first pole 526 is formed on the base plate 522 and protrudes toward the engaging portion 54. The block element 524 protrudes from the mounting plate 520 along an O-O axis of the worm gear 46. When the optical pickup head 30 is reading/writing information at an inner side of the optical disc, the block element 524 contacts an inner edge 220 of the chassis 22. Thus, the block element 524 prevents the main body 32 of the optical pickup head 30 from colliding with the spindle motor 60 to protect the optical pickup head 30.

The engaging portion 54 includes an assembling plate 540, a pair of engaging teeth 542, and a second pole 544. The engaging teeth 542 and a second pole 544 are correspondingly set at two opposite sides of the assembling plate 540. The engaging teeth 542 meshes with the threading 460 of the worm gear 46 for transmitting driving force generated by the feed motor 44 so as to move the optical pickup head 30. The second pole 544 faces to the first pole 526, and a gap is defined between the first pole 526 and the second pole 544. Ends of the spring 58 are sleeved on the first pole 526 and the second pole 544 correspondingly.

The restricting portion 59 is configured for preventing the engaging portion 54 from running out of the worm gear 46. The restricting portion 59 includes a hold member 55 and a grasping member 57. The hold member 55 extends from the engaging portion 54. The hold member 55 includes an enclosure plate 550 and two protruding parts 552 extending from two lateral sides of the enclosure plate 550 correspondingly. A groove 554 is defined between the assembling plate 540 and the enclosure plate 550. Thus the enclosure plate 550 is rotatable with respect to the assembling plate 540 around the groove 554. This makes the hold member 55 has a first state that the enclosure plate 550 is in a same plane as the assembling plate 540 and a second state that the enclosure plate 550 is perpendicular to the assembling plate 540.

The connecting portion 56 includes a connecting arm 560 connecting the fastening portion 52 and the engaging portion 54. A space 562 is defined in the rack 50 between the base plate 522 and the assembling plate 540 for mold releasing when manufacturing the rack 50.

The grasping member 57 and the fastening portion 52 are respectively disposed at two sides of the engaging portion 54. The grasping member 57 extends from a joint between the connecting portion 56 and the engaging portion 54. The grasping member 57 includes two elastic arms 570 parallel to the assembling plate 540. Each of the elastic arms 570 connects to a claw 572 perpendicularly extending from each of the elastic arms 570. A free end of the claw 572 includes a guide surface 574 that is inclined toward the assembling plate 540.

Referring back to FIGS. 1 to 3, a detailed assembly procedure of the optical recording and/or reproducing device 10 will be described. First, the spindle motor 60 is secured to the short side of the chassis 22. The guide members 24a, 24b respectively passes through the guide hole 342 and the guide notch 362. Then the guide members 24a, 24b are respectively disposed on two longer sides of the chassis 22. Thus the optical pickup head 30 is slidably assembled on the base 20. The feed motor 44 and the gear seat 48 are mounted on the chassis 22 with the worm gear 46 parallel to and nearby the first guide member 24a. After that, the rack 50 is connected to the optical pickup head 30. That is, the mounting plate 520 is fixed to the main body 32 of the optical pickup head 30. Meanwhile, the worm gear 46 is disposed in the gap between the grasping member 57 and the engaging portion 54. Thus the engaging teeth 542 meshes with the threading 460 of the worm gear 46 as the spring 58 pushes the assembling plate 540. Finally, the enclosure plate 550 is rotated around the groove 554 till the two protruding parts 552 are clasped by the two claws 572. When the enclosure plate 550 is rotated, the elastic arms 570 are stretched opposite to the assembling plate 540 and the guide surface 574 guides the two protruding parts 552 to be clasped by the two claws 572. Therefore, the worm gear 46 is surrounded by the engaging portion 54, the hold member 55, and the grasping member 57.

When the optical recording and/or reproducing device 10 reads/writes data from/onto the optical disc, the feed motor 44 drives the worm gear 46 to rotate. The rack 50 is moved linearly because the engaging teeth 542 of the rack 50 is meshed with the threading 460 of the worm gear 46. Therefore, the optical pickup head 30 is moved linearly because the rack 50 is fixed to the optical pickup head 30. If the pressure between the worm gear 46 and the engaging teeth 542 is too great that will make the engaging teeth 542 detaches from the threading 460, the hold member 55 and the grasping member 57 will hold the worm gear 46, thus preventing the engaging teeth 542 from being separated from the threading 460. The two claws 572 clasps the two protruding parts 552, thus the hold member 55 would not return to the first state even when there is too much pressure. Therefore, the hold member 55 remains around the worm gear 46. Consequently, the optical pickup head 30 is precisely moved.

In other alternative embodiments, the number of engaging teeth 542 can be changed, such as one or three, etc. The spring 58 may be replaced with other elastic members, such as an elastic metal plate. Moreover, the hold member 55 may be not rotatable and remains perpendicular to the assembling plate 540, meanwhile the grasping member 57 is rotatable with respect to the connecting portion 56. Furthermore, both of the hold member 55 and the grasping member 57 may be rotatable.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:
1. An optical recording and/or reproducing device for reading and/or writing an optical disc, the optical recording and/or reproducing device comprising:
    a base;
    an optical pickup head slidably assembled on the base; and
    a moving mechanism for slidably moving the optical pickup head, the moving mechanism comprising:
        a worm gear;
        a motor connected to the worm gear for rotating the worm gear; and
        a rack disposed between the worm gear and the optical pickup head for transferring motion from the worm gear to the optical pickup head, the rack comprising:
            a fastening portion for fixing the rack to the optical pickup head;
            an engaging portion for engaging with the worm gear;
            a restricting portion connected to the engaging portion for preventing the engaging portion from being separated from the worm gear and
            a connecting portion for connecting the fastening portion with the restricting portion;

wherein the restricting portion comprising:
a hold member connected to the engaging portion for preventing the engaging portion from being separated from the worm gear, the hold member comprising:
an enclosure plate; and
two protruding parts extending from two lateral sides of the enclosure plate; and
a grasping member for grasping the hold member.

2. The optical recording and/or reproducing device as claimed in claim 1, wherein the hold member is extended from the engaging portion and rotatable with respect to the engaging portion.

3. The optical recording and/or reproducing device as claimed in claim 2, wherein a groove is defined between the engaging portion and the hold member.

4. The optical recording and/or reproducing device as claimed in claim 1, wherein the grasping member comprises an elastic arm and a claw perpendicularly extending from the elastic arm for clasping the hold member.

5. The optical recording and/or reproducing device as claimed in claim 4, wherein a free end of the claw defines a guide surface inclined toward the engaging portion for guiding the hold member to be clasped by the claw.

6. The optical recording and/or reproducing device as claimed in claim 1, wherein the fastening portion comprises a block element protruding along an axis of the worm gear for protecting the optical pickup head.

7. An apparatus for transferring motion to a device, comprising:
a worm gear;
a motor connected to the worm gear for rotating the worm gear; and
a rack disposed between the worm gear and the device for transferring motion from the worm gear to the device, the rack comprising:
a fastening portion for connecting the device;
an engaging portion for engaging with the worm gear;
a restricting portion connected to the engaging portion for preventing the engaging portion from being separated from the worm gear; and
a connecting portion for connecting the fastening portion with the restricting portions
wherein the restricting portion comprising:
a hold member connected to the engaging portion for preventing the engaging portion from being separated from the worm gear, the hold member comprising:
an enclosure plate; and
two protruding parts extending from two lateral sides of the enclosure plate; and
a grasping member for grasping the hold member.

8. The apparatus as claimed in claim 7, wherein the hold member is extended from the engaging portion and rotatable with respect to the engaging portion.

9. The apparatus as claimed in claim 8, wherein a groove is defined between the engaging portion and the hold member.

10. The apparatus as claimed in claim 7, wherein the grasping member comprises an elastic arm and a claw perpendicularly extending from the elastic arm for clasping the hold member.

11. The apparatus as claimed in claim 10, wherein a free end of the claw defines a guide surface inclined toward the engaging portion for guiding the hold member to be clasped by the claw.

12. The apparatus as claimed in claim 7, wherein the grasping member and the fastening portion are respectively disposed at two sides of the engaging portion.

13. The apparatus as claimed in claim 12, wherein the grasping member is extended from a joint between the connecting portion and the engaging portion.

14. The apparatus as claimed in claim 7, wherein the grasping member is rotatable with respect to the connecting portion.

15. The apparatus as claimed in claim 7, wherein the engaging portion comprises an assembling plate and an engaging tooth disposed on the assembling plate for meshing with a threading of the worm gear.

16. The apparatus as claimed in claim 15, wherein the engaging portion further comprises a pole for assembling a elastic member between the fastening portion and the assembling plate.

* * * * *